United States Patent
Spiegel et al.

(10) Patent No.: US 9,320,385 B2
(45) Date of Patent: Apr. 26, 2016

(54) BARCODE FOR A BEVERAGE PREPARATION CAPSULE

(75) Inventors: Akos Spiegel, Chables (CH); Gerhard Pirker, Lenzburg (CH)

(73) Assignee: Nestec S.A., Vevey (CH)

( * ) Notice: Subject to any disclaimer, the term of this patent is extended or adjusted under 35 U.S.C. 154(b) by 187 days.

(21) Appl. No.: 13/982,827

(22) PCT Filed: Jan. 31, 2012

(86) PCT No.: PCT/EP2012/051559
§ 371 (c)(1),
(2), (4) Date: Jul. 31, 2013

(87) PCT Pub. No.: WO2012/104301
PCT Pub. Date: Aug. 9, 2012

(65) Prior Publication Data
US 2013/0312619 A1    Nov. 28, 2013

(30) Foreign Application Priority Data
Feb. 1, 2011    (EP) .................................... 11152828

(51) Int. Cl.
*A47J 31/00*    (2006.01)
*A47J 31/44*    (2006.01)
(Continued)

(52) U.S. Cl.
CPC .......... *A47J 31/4492* (2013.01); *A47J 31/3623* (2013.01); *A47J 31/3633* (2013.01); *A47J 31/3676* (2013.01); *B65D 85/8043* (2013.01); *B65D 2203/06* (2013.01)

(58) Field of Classification Search
CPC .............. A47J 31/3623; A47J 31/3633; A47J 31/3642; A47J 31/3676; A47J 31/3695
USPC ........................ 99/295, 323, 289 R
See application file for complete search history.

(56) References Cited

U.S. PATENT DOCUMENTS 5,974,950 A * 11/1999 King ........................... 99/289 R
7,252,235 B2 * 8/2007 Kucher et al. ............ 235/462.16
(Continued)

FOREIGN PATENT DOCUMENTS

| GB | 2411105 | 8/2005 |
|---|---|---|
| JP | 2004511994 | 4/2004 |

(Continued)

OTHER PUBLICATIONS

Japanese Office Action for Application No. P2013-550911, Dispatch No. 356140, dated Aug. 4, 2015, 8 pages.

*Primary Examiner* — Reginald L Alexander
(74) *Attorney, Agent, or Firm* — K&L Gates LLP

(57) ABSTRACT

A beverage preparation system comprising: (i) a capsule (1 1) with side (16), bottom (18) and top (14) walls, said capsule having a shape that is substantially symmetrical around a vertical axis, and said capsule is suitable for containing a beverage preparation ingredient to be dissolved, and/or infused, and/or extracted under pressure, by action of a fluid circulating into said capsule through said ingredient, (ii) a beverage preparation machine (1) suitable for receiving said capsule (11), and circulating said fluid into said capsule, (iii) optionally a capsule holder (9) for holding said capsule (1 1), at least at the time said capsule is disposed into said machine, characterized in that: the machine (1) comprises a linear barcode reader (21) suitable for reading a linear barcode sequence (25) contained in a segment S having a segment length $L_R$, said linear barcode reader (21) being disposed in the machine such that it can read a barcode printed on the capsule while said capsule is being inserted inside said machine, and the capsule (1 1) comprises a barcode sequence (25) that is repeatedly printed along a peripheral path of the capsule, each sequence being disposed in an arc having a linear projected length $L_S$ that is inferior to $L_R$ and said sequence (25) is composed of dots (26) spaced apart from one another along said arc, such that their projected point images along a linear segment are also spaced apart.

8 Claims, 3 Drawing Sheets

(51) Int. Cl.
*A47J 31/36* (2006.01)
*B65D 85/804* (2006.01)

(56) References Cited

U.S. PATENT DOCUMENTS

| | | | |
|---|---|---|---|
| 7,316,178 B2 * | 1/2008 | Halliday et al. | 99/295 |
| 7,444,925 B2 * | 11/2008 | Mahlich | 99/289 P |
| 8,857,317 B2 * | 10/2014 | Manser et al. | 99/289 R |
| 2002/0048621 A1 * | 4/2002 | Boyd et al. | 426/77 |
| 2008/0304891 A1 * | 12/2008 | Saijo et al. | 400/76 |
| 2010/0078480 A1 | 4/2010 | Aker | |

FOREIGN PATENT DOCUMENTS

| | | |
|---|---|---|
| WO | 0133488 | 5/2001 |
| WO | WO0228241 | 4/2002 |
| WO | WO2005044067 | 5/2005 |
| WO | WO2009084061 | 7/2009 |
| WO | WO2010009753 | 1/2010 |

* cited by examiner

BARCODE FOR A BEVERAGE PREPARATION CAPSULE

CROSS REFERENCE TO RELATED APPLICATIONS

The present application is a National Stage of International Application No. PCT/EP2012/051559, filed on Jan. 31, 2012, which claims priority to European Patent Application No. 11152828.7, filed Feb. 1, 2011, the entire contents of which are being incorporated herein by reference.

FIELD OF THE INVENTION

The present invention concerns a barcode to be printed onto a beverage-preparation capsule or pod, which allows automatic recognition by a beverage-preparation machine wherein it is inserted.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine of the invention is a beverage preparation machine working a rigid capsule.

The machine comprises a receptacle for accommodating said capsule and a fluid injection system for injecting a fluid, preferably water, under pressure into said capsule. Water injected under pressure in the capsule, for the preparation of a coffee beverage according to the present invention, is preferably hot, that is to say at a temperature above 70° C. However, in some particular instances, it might also be at ambient temperature. The pressure inside the capsule chamber during extraction and/or dissolution of the capsule contents is typically about 1 to 6 bar for dissolution products, 2 to 12 bar for extraction of roast and ground coffee. Such a preparation process differs a lot from the so-called "brewing" process of beverage preparation particularly for tea and coffee, in that brewing involves a long time of infusion of the ingredient by a fluid (e.g. hot water), whereas the beverage preparation process allows a consumer to prepare a beverage, for instance coffee within a few seconds.

The principle of extracting, infusing, and/or dissolving the contents of a closed capsule under pressure is known and consists typically of confining the capsule in a receptacle of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patent n° EP 1 472 156 B1, and in EP 1 784 344 B1.

Machines allowing the application of this principle have already been described for example in patents CH 605 293 and EP 242 556. According to these documents, the machine comprises a receptacle for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. The way the water circulates within the machine is selected via a selecting valve means, such as for instance a peristaltic valve of the type described in applicant's European patent application EP 2162653 A1.

When the beverage to be prepared is coffee, one interesting way to prepare the said coffee is to provide the consumer with a capsule containing roast and ground coffee powder, which is to be extracted with hot water injected therein.

Capsules have been developed for such an application, which are described and claimed in applicant's European patent EP 1 784 344 B1, or in European patent application EP 2 062 831.

In short, such capsules comprise typically:
- a hollow body and an injection wall which is impermeable to liquids and to air and which is attached to the body and adapted to be punctured by e.g. an injection needle of the machine,
- a chamber containing a bed of roast and ground coffee to be extracted,
- an aluminum membrane disposed at the bottom end of the capsule, closing the said capsule, for retaining the internal pressure in the chamber, the said membrane being associated with piercing means for piercing dispensing holes in the said aluminum membrane when said internal pressure inside the chamber reaches a certain predetermined value,
- optionally, means configured to break the jet of fluid so as to reduce the speed of the jet of fluid injected into the capsule and distribute the fluid across the bed of substance at a reduced speed.

Beverage preparation machines as described above are usually designed to accept a variety of different types of capsules, so as to allow a consumer to select in a wide range of products which beverage types she/he likes.

Depending on the type of beverage is prepared, preparation parameters may vary, for instance: delivery volume in cup, temperature of the fluid circulating through the capsule or pod, pressure of the fluid inside the capsule during preparation.

In many machines that are present on the market today, these preparation parameters are selected manually by the consumer, or some of them are fixed, and cannot be varied, which is a clear limitation in the level of product quality that can be achieved. For instance, the consumer can chose which volume of beverage he likes in the cup, but there is no possibility to vary the pressure or temperature of the fluid circulating through the capsule. In that case, fluid pressure and temperature are substantially the same for an espresso coffee, for a tea-based beverage, or for a chocolate-based drink, although it is known that such parameters like fluid pressure and temperature should be adapted to the type of ingredient which needs to be infused, extracted under pressure, or dissolved.

To solve this issue, some beverage preparation systems have been developed, whereby the capsule type is detected automatically by the machine, such that the latter automatically adapts its settings, hence the preparation parameters, as a function of the type of ingredient contained in each different type of capsule/pod.

WO 2005/044067 A1 discloses an apparatus for determining the traceability of the contents of a container as well as the origin of said container, wherein information provided on said container can be read using an optical and/or magnetic reader but is invisible to the naked eye. Said container comprises a pierceable upper portion for injecting a liquid into the container, and a pressure-pierceable lower diaphragm for discharging the liquid flavored by the contents of the container. The apparatus includes an optical and/or magnetic reader for reading said information off a container placed inside the apparatus, a microprocessor for encrypting and decrypting, processing, comparing, approving or rejecting and storing the information read off a container, and for selectively initiating or not initiating an operative cycle which includes piercing the upper portion of the container and injecting the liquid, as well as for storing said information to ensure readiness for the initiation of a fresh cycle.

One type of detection is based on recognition by the machine of the shape of the capsule. In this case, each capsule type differs from other capsule types by a shape-specific element disposed at a location at the surface of said capsule, which corresponds to a shape sensor of the machine when said capsule is inserted in the latter. This detection system, although efficient, is expensive in that it requires different manufacturing lines to produce each different type of capsule: it is not possible to standardize the capsule body. Moreover, it requires a contact between the capsule and the shape sensor of the machine, such that the functional dimensions between capsule and machine have to be very carefully monitored and set up in the factory, which adds to the manufacturing difficulty and expenses.

Another type of detection is based on magnetic recognition by the machine, of a magnetic code that is present in the capsule. Such a magnetic code can take the form of a magnetic band that is printed, attached to, or otherwise integrated into the capsule material. Such a detection type allows a great variety of codes, so that an important variety of different capsule types can be managed. However, it requires an important investment in machines to produce the magnetic code inside the capsules, and the magnetic sensor inside the machine is rather expensive, which is not compatible with a reasonable manufacturing cost for consumer goods such as beverage preparation machines, whose price must remain as low as possible.

Yet another type of detection that can be used is colour recognition of at least one part of the capsule by a colour sensor disposed in the machine. Each colour, or colour combination—in case various parts of the machine having different colours are detected—codes for a type of ingredient contained therein. Although this solution is an interesting way to allow an automatic detection of the capsule, it remains quite expensive, especially the colour sensors. Moreover, the colour sensors are very sensitive to ambient light and require that the detection be made inside the machine, or preferably, that a light emitting source—for instance a light emitting diode be used to give a standard light colour measure to the sensor before the latter detects the capsule colour. The true capsule colour is in that case a differential measurement obtained by processing the two measures. Also the detection in that case is precise and reproducible, it remains an expensive way of detection.

Yet another type of detection that is proposed is called "RFID" for "Radio Frequency Identification". This consists in placing a small chip into the capsule, which emits a specific radio frequency, that is detected by an RFID sensor placed in the machine. Each given frequency codes for a capsule type. Although this technology is reliable and efficient, it is too expensive compared to other available techniques.

Last but not least, detection of the capsule type can be performed by barcode recognition. In this case, a one-dimensional, or two-dimensional barcode is printed on the surface of the capsule, which is read by a barcode reader disposed in the beverage preparation machine. This technique is very much used, as it is reliable, efficient, and rather cheap. However, it requires printing on the capsule, preferably on a flat surface of the capsule, i.e. on the top side of the latter. However, for aesthetic reasons, or because other information is already printed on said capsule—for instance brand name, logo, picture, ingredient information, or other consumer information—, printing the capsule with a barcode can be difficult.

Additionally, in many instances where the capsule has the shape of a frustoconical cylinder, closed at its top by a membrane, it is necessary to print the barcode in a central position of the top side (i.e. top membrane) of the capsule, and said barcode needs to be a 2D barcode, so that the latter can be read by the machine, whatever the rotational position of the capsule inside the machine (relative to its vertical axis). Applicant's European patent applications EP AN 10151030.3 and EP AN 10151020.4 disclose such a centered 2D barcode on a capsule for recognition.

A problem with 1D and 2D barcodes is that the capsule needs to be oriented relative to the reader so that the latter can read the code properly. Alternatively, existing machines that can detect and read the code whatever the orientation of the capsule along its vertical axis, necessarily require powerful, hence very expensive, processors to calculate the code from an image that is recorded by a sensor. As can be understood, the existing technology related to 1D or 2D barcodes comprises major drawbacks. Last but not least, with these technologies, the barcode reader has to be placed at a certain minimal distance from the capsule surface that contains the code, so as to be able to read the latter. This adds to the difficulty in implementing such technologies, due to the fact that beverage preparation machines have to be as compact as possible, especially when they are designed and sold for in-home use.

In order to solve the barcode printing issue at the surface of the capsule, invisible ink barcodes have been developed, which allow a barcode to be printed at a location of the capsule, e.g. centered across the top membrane of the capsule, where a visible printing is already present. The invisible barcode is detected by illuminating the same with a specific light wavelength, for instance a UV or infrared light source disposed within the beverage preparation machine together with the barcode reader. Such a technique however is expensive due to the equipment that is required inside the machine, and also due to the rather high cost of invisible ink compared to a classic, visible, ink.

As can be seen, although various solutions have been proposed to allow automatic detection of the capsule by the beverage preparation machine, there is still a need for a detection system which is inexpensive, efficient, reliable, which allows to code for a large amount of data so that a wide selection of different capsule types can be coded and recognized by the machine, and last but not least, which does not require a lot of space at the surface of the capsule, so as not to impair the capsule aesthetics, or otherwise leaves sufficient surface in the centre of the capsule sides for printing logos, brand names, and ingredient information.

SUMMARY OF THE INVENTION

The need described above is met with the present invention, with a beverage preparation system comprising:
- a capsule with side, bottom and top walls, said capsule having a shape that is substantially symmetrical around a vertical axis, and said capsule is suitable for containing a beverage preparation ingredient to be dissolved at atmospheric or above atmospheric pressure, and/or infused at atmospheric pressure, and/or extracted under pressure by action of a fluid circulating into said capsule through said ingredient,
- a beverage preparation machine suitable for receiving said capsule, and circulating said fluid into said capsule,
- optionally a capsule holder for holding said capsule, at least at the time said capsule is placed into said machine, characterized in that:
- the machine comprises a linear barcode reader suitable for reading a linear barcode sequence contained in a segment S having a segment length $L_R$, said linear barcode reader being disposed in the machine such that it can read a barcode printed on the capsule while said capsule is being inserted inside said machine, and
- the capsule comprises a barcode sequence that is repeatedly printed along a peripheral path of the capsule, each sequence being disposed in an arc having a linear projected length $L_S$ that is inferior to $L_R$, and said sequence is composed of dots spaced apart from one another along said arc such that their projected point images along a linear segment are also spaced apart.

The present invention is not meant to be limited to rigid capsules, but also encompasses soft or semi-rigid pods, pads, or other similar dose-packages. Such packages can be made in any kind of suitable material, permeable or impermeable to liquids and/or gases.

When the capsule in the capsule holder slides in the extraction head and the reader is continuously reading during this process, the dots leave a linear barcode trace that can be used for recognition. A short section of dots represents the code itself, that is then repeated around the perimeter, so that one full code always falls in the scope of the reader.

The present invention brings the advantage over known technologies that the code sensing and reading does not depend on the capsule rotational position (i.e. orientation) in the machine, so that the user can place a capsule that has a symmetrical shape in any position in the machine (or in the capsule holder), and the machine will be able to read the code printed thereonto. Moreover, the distance between the capsule surface containing the code, and the code reader does not have as much as an impact compared to known technologies due to the fact that the code dots are small. The sensor can therefore be placed at a short distance from the capsule surface, which allows to manufacture compact machines.

In a preferred embodiment of the present invention, each dot in the code sequence is a circle of predetermined diameter. Of course, this means that if a code sequence comprises several dots, all dots can have same or different diameters. The data in the code sequence is a function of the number of dots, and/or the diameter of each dot in the sequence, and/or the distance between two dots positioned in a row.

Advantageously, each diameter has a value comprised between 0.1 and 5 mm, preferably between 0.5 and 3 mm, and more preferably between 0.7 and 2 mm.

In one preferred embodiment of the invention, said capsule is a rigid capsule comprising a frustoconical body with side and bottom walls, said body being closed at the top with a circular membrane forming the top side.

In the latter embodiment, the linear bar code reader is preferably disposed inside said the machine such that during insertion of the capsule into said machine, the centre $C_{ra}$, of the reading area is aligned with the centre $C_{tm}$, of the top membrane, and the direction of insertion d is substantially perpendicular to the transversal axis t of said reading area.

In a highly preferred embodiment of the present invention, the peripheral barcode is printed along the external peripheral edge of the capsule top side.

In an embodiment of the invention, the capsule top wall can comprise a printed area centered across said top wall, said printed area comprising a logo, and/or a brand name, and/or usage instructions and/or a drawing, and/or a photo.

In the latter embodiment of the invention, said printing can be performed with invisible ink. Invisible ink, is typically a fluorescent ink.

Preferably, said beverage comprises a coffee, tea, dairy, herbal and/or infant nutrition ingredient, and preferably the preparation fluid is hot or cold water.

The present invention is further directed to a capsule having side, bottom and top walls, said capsule further having a shape that is substantially symmetrical around a vertical axis, and said capsule being suitable for containing a beverage preparation ingredient to be dissolved and/or infused and/or extracted under pressure by action of a fluid circulating into said capsule through said ingredient, said capsule being suitable for use with a beverage preparation machine equipped for receiving said capsule and for circulating said fluid into said capsule, said machine comprising a linear barcode reader suitable for reading a linear barcode sequence contained in a segment having a segment length $L_R$, characterized in that said capsule comprises a barcode sequence that is repeatedly printed along a peripheral path of the capsule, each sequence being disposed in an arc segment S having a linear projected length $L_S$ that is inferior to $L_R$, and said sequence is composed of dots spaced apart from one another along said arc S, such that their projected point images along a linear segment are also spaced apart, and said barcode sequence can be read by the barcode reader of the machine during insertion of the capsule thereinto.

Preferably, the capsule of the invention is a rigid capsule comprising a frustoconical body with side and bottom walls, said body being closed at the top with a circular membrane forming the top side.

Also preferably, the dots are circles of predetermined diameters, and more preferably, each diameter has a value comprised between 0.1 and 5 mm, preferably between 0.5 and 3 mm, and more preferably between 0.7 and 2 mm.

In a highly preferred embodiment of the present invention, the peripheral barcode is printed along the external peripheral edge of the capsule top side.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
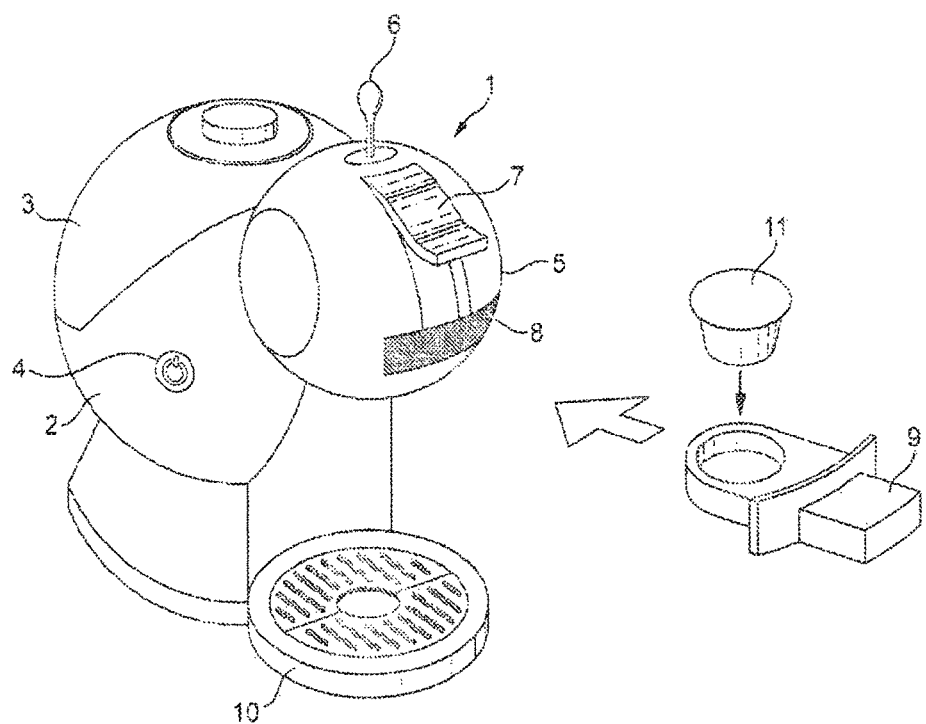
FIG. 1 is a schematic perspective view of a beverage preparation machine according to the invention.

The present invention relates to beverage preparation machines, such as the one illustrated in FIG. 1. As can be seen, the machine 1 comprises a machine body 2, a water reservoir 3 that can be removed from the machine body 2 for refill. The body 2 comprises an on/off push button 4. The machine 1 further comprises a extracting head 5. The head 5 comprises a water temperature selector 6 for hot or cold water, a locking lever 7, and an opening 8 for insertion of a capsule holder 9. The machine 1 further comprises a cup tray 10, for holding a cup under the extraction head.

Figure 2:
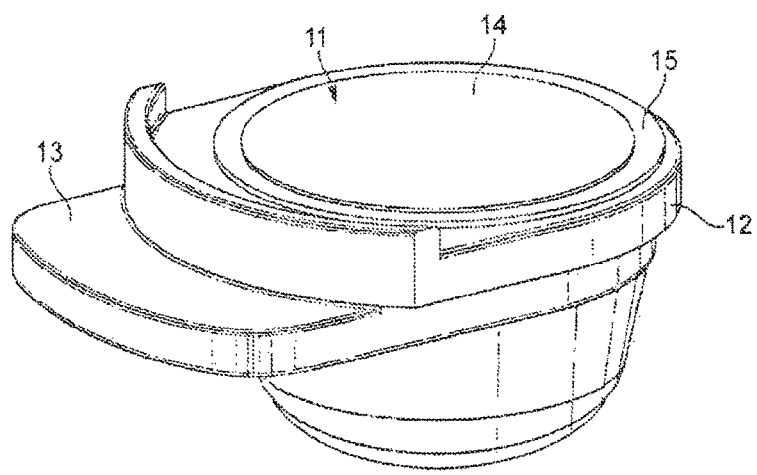
FIG. 2 is a perspective view of a capsule holder with a capsule disposed therein, ready for insertion into the beverage preparation machine.

The capsule holder 9 is adapted to receive a capsule 11. An enlarged view of the capsule holder 9 is shown in FIG. 2, wherein a capsule 11 is disposed. The capsule holder comprises a body portion 12 designed as a receptacle for the capsule 11, and further comprises a handle 13. As shown in FIG. 2, the receptacle is designed so that the top side 13 of the capsule 11 is turned upwardly and is fully accessible from above, including the upper surface of the peripheral edge 14 of said capsule.

Figure 3:
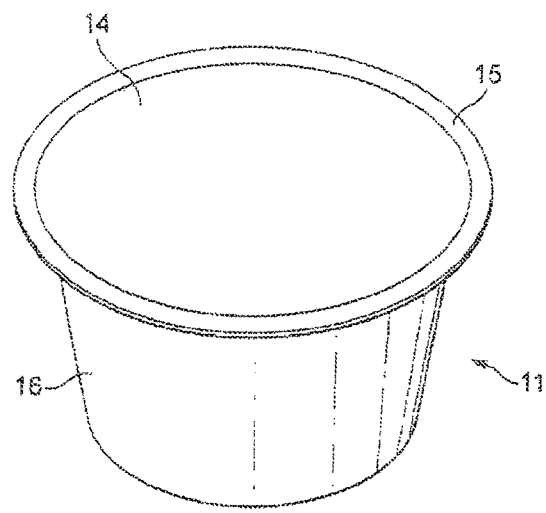
FIG. 3 is a schematic perspective view of a capsule according to the invention.

FIG. 3 illustrates a capsule 11 for use in a beverage preparation system according to the invention. The capsule 11 comprises a capsule body with side walls 16 and a bottom wall, as well as the top side 14 which is covered with a flexible membrane. More precisely, the capsule is rigid with a frustoconical body, and said body is closed at the top with a circular membrane forming the top side. The membrane is meant to be pierced by an injection needle of the machine, at the time the capsule holder and capsule are inserted inside said machine in a functional position, so that during preparation of the beverage, the machine injects water inside the capsule through said needle.

Figure 4:
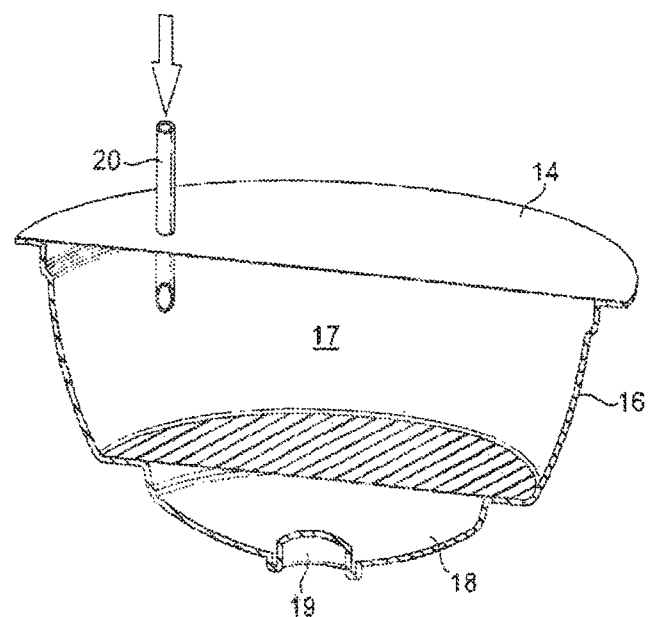
FIG. 4 is a cut view similar to FIG. 3.

A partially cut view of the capsule 11 is shown in FIG. 4. The capsule body defines a internal volume 17 between side walls 16, bottom wall 18 and top side membrane 14, wherein a beverage preparation ingredient (not shown) is disposed. The bottom side 18 comprises a outlet opening 19, through which the beverage prepared in the capsule is ejected. As shown in FIG. 4, the top membrane 14 is pierceable by a water injection needle 20. The internal volume 17 is delimited at the bottom by a self-opening wall that can open when pressure is exerted from inside—e.g. internal pressure buildup inside the capsule—or from outside. Such a configuration allows to keep the internal volume 17 closed and tight during storage, until the capsule is used, and guarantees the freshness of the ingredient contained therein.

Figure 5:
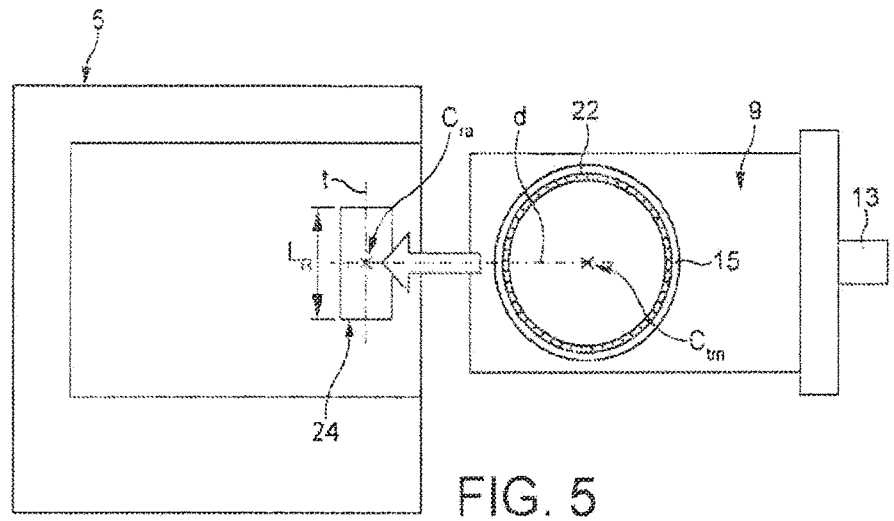
FIG. 5 is a schematic top view illustrating the detection system in the beverage preparation machine, and to capsule holder loaded with a capsule being inserted into said machine.

Now turning to the core of the invention, the machine comprises a linear barcode reader 21, illustrated in FIG. 5, which is suitable for reading a linear barcode contained in a segment having a segment length $L_R$. The linear barcode reader is preferably a linear CCD sensor of the type having a line of pixel aligned along the width of the sensor.

Said linear barcode reader 21 is disposed in the machine extraction head 5 such that it can read a barcode 22 printed on the capsule 11 while said capsule is being inserted inside said machine 1, as illustrated schematically in FIG. 5.

As illustrated in FIG. 5, the linear bar code reader 21 is disposed inside said machine such that during insertion of the capsule 11 into said machine 1, the centre $C_{ra}$, of the sensor's reading area is aligned with the centre $C_{tm}$, of the capsule's top membrane, and the direction of insertion d is substantially perpendicular to the transversal axis t of said sensor's reading area.

As shown in FIG. 6, the barcode 22 comprises a barcode sequence 25 that is repeatedly printed along a peripheral path of the capsule peripheral edge 15.

Each sequence 25 is disposed in an arc segment S having a linear projected length $L_S$ that is inferior to the width of the barcode reader's sensing area, i.e. $L_R$. The peripheral barcode 22 is printed along the external peripheral edge 15 of the capsule top side 14.

The barcode sequence 25 is composed of dots 26 spaced apart from one another along said arc such that their projected point images along a linear segment are also spaced apart. The dots 26 are circles of predetermined diameters. Each diameter has a value comprised between 0.1 and 5 mm, preferably between 0.5 and 3 mm, and more preferably between 0.7 and 2 mm.

Figures 6A, 6B, 6C:
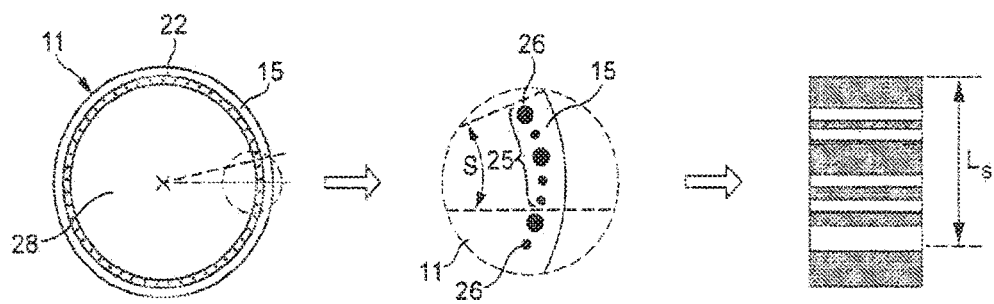
FIGS. 6A, 6B and 6C illustrate how a code segment printed at the periphery of the capsule top edge is detected and read by the barcode reader, as a linear barcode, during insertion movement of the capsule in front of said reader.

As can be seen from FIGS. 5 and 6, and especially from FIGS. 6B and 6C, when the capsule 11 is translated under the barcode reader 21, i.e. during insertion movement of the capsule 11 inside the machine 1, the dots 26 of the barcode sequence 25 are detected and interpreted as parallel lines 27, as shown in FIG. 6C. These lines 27 form the detected barcode sequence which is interpreted and processed for actuation of the machine's program. The machine is then set up automatically to a beverage preparation setting that fits the requirements of the ingredient contained in the capsule, and said machine adjusts automatically, for instance the temperature and/or volume of water injected inside the capsule, the time of injection, and/or the pressure of injection.

As illustrated in FIG. 6A, the capsule top wall 14 comprises a printed area 28 centered across the capsule top wall, said printed area comprising a logo, and/or a brand name, and/or usage instructions and/or a drawing, and/or a photo (not shown on the drawing).

Optionally, the barcode printing is performed with an invisible ink that is detected and read by a UV or infrared sensor.

The barcode sequence is printed by any known method such as for instance an inkjet printing process. During the printing process, the capsule is rotated, or the printer head can turn around the capsule during printing so as to print along the whole periphery of said capsule. Optionally, a specific inkjet printing head can be used which has a circular shape, so as to correspond to the circular printing area. With such a system, the circular barcode sequence can be printed in one step, without rotational movement of the capsule or printing head.

The invention claimed is:
1. A beverage preparation system comprising:
   a capsule with side, bottom and top walls, the capsule having a shape that is substantially symmetrical around a vertical axis, the capsule is a rigid capsule comprising a frustoconical body with side and bottom walls, the body closed at the top with a circular membrane forming the top side, and the capsule is suitable for containing a beverage preparation ingredient to be dissolved, and/or infused, and/or extracted under pressure, by action of a fluid circulating into the capsule through the ingredient;

a beverage preparation machine suitable for receiving the capsule and circulating the fluid into the capsule;

the machine comprises a linear barcode reader suitable for reading a linear barcode sequence contained in a segment having a segment length $L_R$, the linear barcode reader being positioned in the machine such that the linear barcode reader can read a barcode printed on the capsule while the capsule is being inserted inside the machine;

the capsule comprises a barcode sequence that is repeatedly printed along a peripheral path of the capsule, each sequence being disposed in an arc having a linear projected length $L_S$, the linear projected length $L_S$ is less than the length $L_R$ for which the linear barcode reader is suitable, and the sequence is composed of dots spaced apart from one another along the arc such that their projected point images along a linear segment are also spaced apart; and the linear bar code reader is positioned inside the machine such that during insertion of the capsule into the machine, the center $C_{ra}$ of the reading area is aligned with the center $C_{tm}$ of the circular membrane forming the top side of the capsule, and the direction of insertion is substantially perpendicular to the transversal axis of the reading area.

2. The beverage preparation system of claim 1, wherein each dot in the sequence is a circle of predetermined diameter.

3. The beverage preparation system of claim 2, wherein each diameter is between 0.1 and 5 mm.

4. The beverage preparation system of claim 1, wherein the peripheral barcode is printed along the external peripheral edge of the capsule top side.

5. The beverage preparation system of claim 1, wherein the capsule top wall comprises a printed area centered across the top wall, the printed area comprising print selected from the group consisting of a logo, a brand name, usage instructions, a drawing, and a photo.

6. The beverage preparation system of claim 1, wherein the printing is performed with an invisible ink.

7. The beverage preparation system of claim 1, wherein the beverage is selected from the group consisting of a coffee, tea, dairy, herbal and infant nutrition ingredient.

8. The beverage preparation system of claim 1, wherein the preparation fluid is hot or cold water.

* * * * *